United States Patent [19]

Mosser et al.

[11] Patent Number: 5,116,672

[45] Date of Patent: May 26, 1992

[54] ORGANIC COATINGS WITH ION REACTIVE PIGMENTS ESPECIALLY FOR ACTIVE METALS

[75] Inventors: Mark F. Mosser, Sellersville; William A. Harvey, III, MontClare, both of Pa.

[73] Assignee: Sermatech International, Inc., Limerick, Pa.

[21] Appl. No.: 475,353

[22] Filed: Feb. 5, 1990

[51] Int. Cl.⁵ .................. B32B 15/02; B32B 5/16; B32B 5/18

[52] U.S. Cl. .................. 428/328; 523/442; 523/223; 428/458; 428/469; 428/626; 428/628

[58] Field of Search ............ 428/323, 328, 463, 458, 428/469, 626, 628; 523/457, 458, 440, 442, 223, 451

[56] References Cited

U.S. PATENT DOCUMENTS

| | | | |
|---|---|---|---|
| 3,248,251 | 4/1966 | Allen | 428/450 |
| 4,097,445 | 6/1978 | Martins et al. | 428/328 |
| 4,252,707 | 2/1981 | Ruid | 524/602 |
| 4,532,289 | 7/1985 | Mosser et al. | 524/406 |
| 4,537,632 | 8/1985 | Mosser | 106/14.12 |
| 4,554,213 | 11/1985 | Marini et al. | 523/451 |
| 4,606,967 | 8/1986 | Mosser | 428/472 |
| 4,617,056 | 10/1986 | Mosser et al. | 106/1.12 |
| 4,650,819 | 3/1987 | Nakamoto et al. | 523/223 |
| 4,659,613 | 4/1987 | Mosser et al. | 428/697 |
| 4,675,350 | 6/1987 | Marchetti et al. | 524/500 |
| 4,711,916 | 12/1987 | Hagiwara et al. | 523/223 |
| 4,724,172 | 2/1988 | Mosser et al. | 428/697 |
| 4,806,161 | 2/1989 | Fabiny et al. | 428/450 |

OTHER PUBLICATIONS

Department of the Navy (MIL-M-45202B, Oct. 1968) document (35 pp.), Military Specification—Magnesium, Alloys and Anodic Treatment of.

Ministry of Technology (D.T.D. 911DC, May 1963) (7 pp.), Process Specification—Protection of Magnesium-Rich Alloys Against Corrosion.

Amoco Chemicals Corporation, Bulletin AM-1 (15 pp.), Amoco Amide-Imide Polymers.

Corrosion Science, vol. 26, No. 9, pp. 727–734, 1986, Mansfeld et al., Evaluation of Corrosion Protection Measures for Metal Matrix Composites.

Magnesium Elektron, Ltd., Brochure, pp. 3–14, Surface Treatments for Magnesium Alloys in Aerospace & Defence.

Amax Magnesium document (34 pp.), Corrosion and Protection of Magnesium.

Mansfeld et al., "The Evaluation of Corrosion Protection Measures for Metal Matrix Composites", Corrosion Science, vol. 26, No. 9, pp. 727–734 (1986).

Primary Examiner—John C. Bleutge
Assistant Examiner—Christopher P. Rogers
Attorney, Agent, or Firm—Weiser & Stapler

[57] ABSTRACT

A coating composition and method of use thereof for coating metal substrates, especially galvanically active metals, containing a resinous organic polymer, a corrosion inhibiting leachable pigment and an ion reactive pigment generally in the form of metallic spheroid particles. Coated materials have improved corrosion resistance.

15 Claims, No Drawings

ORGANIC COATINGS WITH ION REACTIVE PIGMENTS ESPECIALLY FOR ACTIVE METALS

BACKGROUND OF THE INVENTION

This invention relates to a coating composition containing an organic resinous polymer, commonly synthetic polymers and two pigments, especially useful for coating active metal parts, which coating imparts increased resistance to corrosion. Specifically, the improved resistance to corrosion is associated with chemical attack accelerated by corrosive ions in salt spray and acid rain conditions. The invention also provides for metal parts coated with the composition of the invention and a method of coating the metal parts with said composition. The terms used herein are further explained hereinafter.

Electrochemically active metals such as magnesium, zinc and aluminum are widely used in aerospace, aviation, marine, defense, and other industries as structural materials. They are highly desirable because of their weight/strength ratios, and/or ease of fabrication.

Magnesium, zinc and aluminum are high in electrochemical activity as measured by their standard half cell potentials and their galvanic potentials. These metals have common "surface" chemistry. These metals generally form a natural protective film of hydroxide, oxide or carbonate in most environments. However, these films dissolve or are attached in acid solutions and corrosion occurs by pitting and general attack. In particular, these natural protective films are more rapidly attacked as the environment increases in acidity and specifically in the presence of certain ions, including chloride and sulfate ions. Often sulfate, sulfide and chloride ions are found together in precipitation.

There is a pressing and serious need to provide coating compositions and coated metal parts of such galvanically active metals to render these parts less prone to corrosion and more resistant to such environmental damage.

PRIOR ART

U.S. Pat. Nos. 4,724,172 to Mosser et al., 4,659,613 to Mosser et al., 4,617,056 to Mosser et al., 4,606,967 to Mosser, 4,537,632 to Mosser and 3,248,251 to Allen describe inorganic binder coating compositions containing phosphate ions with chromate and/or molybdate as well as aluminum particles. The compositions are used to coat metal parts, in particular steel. They are not suitable for coating magnesium alloys, zinc alloys and most aluminum alloys.

U.S. Pat. No. 4,532,289 to Mosser et al. describes the use of polyvinylidene fluoride with phosphate, chromate and/or molybdate and optionally aluminum. The composition is used to coat metals.

U.S. Pat. No. 4,675,350 to Marchetti et al. describes an epoxy cured polyamide-imide resin which is used as a laminate.

U.S. Pat. No. 4,252,707 to Ruid describes a coating composition containing a water soluble salt of a polyamide-imide containing as pigments red chromate and metallic aluminum.

Mansfeld et al., "The Evaluation of Corrosion Protection Measures for Metal Matrix Composites" in Corrosion Science, vol. 26, no. 9, pps. 727–734, (1986), describes the use of an epoxy/polyamide coating to protect Mg/graphite or Al/graphite substrates.

Magnesium Electron Ltd. brochure (MEL) entitled "Surface Treatments for Magnesium Alloys in Aerospace and Defense", Amax Magnesium brochure, entitled "Corrosion and Protection of Magnesium", The Ministry of Technology (Great Britain) D.T.D. 911C brochure entitled "Process Specification—Protection of Magnesium—Rich Alloys Against Corrosion" (May 1963) and Military Specification MIL-M-45202 entitled "Magnesium Alloys, Anodic Treatment of" (1963) describe methods of pretreating magnesium substrates or methods of coating magnesium materials. The Ministry of Technology, D.T.D. 911C brochure describes the use of an organic primer with strontium chromate and aluminum stearate for coating magnesium rich alloys.

Amoco Chemicals Corporation/Bulletin AM-1 entitled "Amoco Amide-Imide Polymers" describes polyamide-imide polymers with powdered aluminum for bonding metal parts.

The Amoco and MEL publications describe the curing of polymer coatings on metal parts.

The term "metal" as used throughout this application is defined herein to include the elemental metal itself, its alloys and the protective film formed upon exposure of the metal and its alloys to environmental conditions.

SUMMARY OF THE INVENTION

The invention provides for a coating composition containing as essential components a resinous organic polymer, for instance an organic synthetic polymer and two inorganic pigments. The composition is useful for coating metal substrates, especially galvanically active metals. The composition may be liquid or non-liquid although generally the coating composition when applied to the metal to be coated is liquid. It may be designated as a coating or a paint. The invention also provides for metal parts coated with the composition of the invention. The invention further provides for a method of coating metals with the composition of the invention. Other embodiments will become apparent from the description herein.

The organic resinous polymers that are useful in accordance with the invention for the coating are constituted by any polymer suitable for coating metal parts. The term "resinous polymers" is to be understood broadly to include organic naturally occurring and synthetic polymers. Hereinafter the term used to designate the polymers may be for convenience, "synthetic polymer". The synthetic polymer functions as a matrix for the two inorganic pigments as well as being a barrier protective coating for the metal parts. The resinous polymers commonly used in the invention are generally soluble in organic solvents or they may be insoluble, in which case they are in dispersion in a suitable organic liquid or in water (or partially aqueous).

The coating compositions of the invention may also be in non-liquid physical form, for instance as a powder, which contains in admixture the dry resin, pigments and optional ingredients. Hereinafter reference will generally be made to the liquid composition but it is to be understood that such reference includes the non-liquid composition.

The organic polymers used in this invention are those film formers which are capable of being cured at a temperature less than the tempering or heat treatment temperature of the metal substrate to be coated. The maximum cure temperature is dictated by the temper and alloy of the chosen substrate and is not dependent on any specific polymer. One skilled in the art will know what adjustment would be advisable for optimum results.

The liquid (or non-liquid) coating composition of the invention includes a first pigment which functions to react with corrosive ions such as chloride ions and a second pigment which is a corrosion inhibiting leachable pigment.

The ion reactive pigments protect metal substrates from corrosion due to ions. Though the mode of operation or exact function of the ion reactive pigments is not fully known or understood, it is speculated that the pigments may also have a passivating or neutralizing effect to contribute to maintain the pH in the alkaline range within the coating film. This possible effect contributes to allow the second pigment, e.g., a chromate to operate. Such pigments usually perform best in the alkaline range as opposed to the acid range. Whatever the effect of the ion reactive pigments, it is believed to coact with the second pigment in an overall beneficial effect. The ion reactive pigments which function in this manner are generally powders (or pulverulent) metallic spheroid particles. These metallic spheroid particles can be the same metal or metal alloy as the metal substrate coated or a different metal or metal alloy from the metal or metal alloy substrate coated. In the specification (and claims) wherein the term "spheroid-like" is used, it is intended to include the term "dust" and to include particles made by air atomizing, inert gas atomizing, atritting, and other techniques known in the art for the preparation of metal particles.

In accordance with the invention the metallic spheroid particles generally do not exceed a certain average maximum size as further described herein.

The second pigment which is a constituent of the liquid (or non-liquid) composition of the invention is a leachable pigment. The leachable pigment is capable of passivating or inhibiting corrosion of metal; it is also an oxidation inhibitor. The leachable pigment leaches out of the cured coating and assists in the formation of protective films on the metal.

The invention provides further for coated metal parts and alloys thereof which are galvanically active (as measured by their galvanic potential). The metals that generally benefit most by being coated with the coating of the invention are metals designated as "active" metals, that is, metals that are anodic to ferrous materials. However, it is also contemplated that the coatings may be useful on steel and ferrous alloys.

The invention further provides for a method of coating the metal parts with the liquid (or non-liquid) composition of the invention. This method calls preferably curing for the coated metal part at a temperature below the tempering temperature of the metal substrate. Preferred embodiments are described in greater detail hereinafter.

The invention provides in a typical embodiment for a liquid coating composition in which the organic polymer is an epoxy/polyamide-imide dissolved in an appropriate organic solvent. The ion reactive pigment is aluminum spheroids of an average equivalent spherical mean diameter ($\overline{ESD}$) of about 2 to about 10 μm and the leachable pigment is a chromate.

The invention also contemplates a non-liquid composition which includes the above described components without the liquid solvent or carrier for the polymeric resin. At the time of application to the metal part, an appropriate liquid can be added to these components or the coating can be applied as a dry powder by flocking, fluid bed, or electrostatic powder spraying. Use of powder coatings is not general, many resins do not melt and flow so care should be taken on resin selection.

The invention further provides in a typical embodiment for a magnesium, zinc or aluminum metal part or alloys thereof which is coated with the cured composition described above.

The invention further provides in a typical embodiment, a method for applying by a suitable method, the liquid coating composition to the metal part and curing the composition coated on the metal substrate at a temperature less than about 800° F. or at a temperature which is preferably less than the tempering temperature of the metals coated with the coating of the invention.

The invention described herein provides for remarkably improved protection against corrosion in severe environmental conditions such as salt spray, salt air or acid rain conditions.

It is to be noted that the coatings of the invention are not what are called "sacrificial" coatings.

Further, in a sense, the coating of the invention may be deemed to be what is called "barrier" films. Conventional barrier films however are generally not loaded with conductive metallic pigments. This causes the impedance to be as high as possible. If highly loaded with conductive metallic particles (such as aluminum powder), the impedance would be lowered, which is undesirable in a barrier film. Yet the barrier films of the invention, contrary to the conventional type, allow for high loading with the metallic pigments. This is further discussed hereinafter.

DETAILED DESCRIPTION OF THE PREFERRED EMBODIMENTS

A description of the individual components of the coating composition of the invention is set forth herein. Preferred embodiments describing preferred individual components of the invention are set forth herein. Optional ingredients are discussed herein further below.

THE ORGANIC POLYMER

In accordance with the invention, the liquid or non-liquid composition contains an organic resin or polymer. The polymer may be, as stated, organic, synthetic or not, thermoplastic or thermosetting. The composition containing the organic polymer can be in a liquid or non-liquid form. The polymer disclosed herein can be dissolved in suitable solvents or in some cases, dispersed in a suitable liquid or solvent mixture. This may include water. In accordance with the invention, any suitable polymer may be selected by one skilled in the art which is capable of functioning as a matrix for the pigments used (and other optional ingredients) and coating the specified active metals. It is evident that depending on the particular application or use and other pertinent considerations, an appropriate choice of polymer can readily be made.

Classes of polymers (and copolymers thereof) suitable for use in the invention include hydrophobic polymers such as polyolefins, copolyolefins, ionomers, polyamides, copolyamides, halogenated polyolefins, polyesters, unsaturated polyesters, silicone polyesters, epoxy resin polymers, phenoxy resins, alkyd resins, silicone alkyd resins and acrylic resins. Specific polymers suitable for use in the invention include but not limited to the following are:

| | |
|---|---|
| Polyimide | Polyethylene |
| Polypropylene | Polyphenylene sulfide |
| Polyvinylidene fluoride | Polyamide-imide |
| Polyamide-imide (epoxy modified) | Fluorinated ethylene propylene (FEP) |
| Polytetrafluoroethylene (PTFE) | Polyurethane |
| Ethylene copolymers | Ethylene vinyl acetate copolymers |
| Epoxy polyamide | Polyvinyl chloride |
| Polyvinyl fluoride | Organosiloxazane |
| Polyvinylidine chloride | Polystyrene and others |
| Polyacrylonitrile | Cellulose acetate |

A preferred polymer is an epoxy polyamide-imide.

The polymers useful as components of the composition of the invention include those polymers which can be cured at a temperature that does not adversely effect the properties of the metal to which the coating is applied. A preferred temperature range for curing the polymer is from ambient temperature to about 800° F. frequently to about 500° F. The polymer may form a film by solvent evaporation, by melting and flowing out onto the surface, by coalescing of resin particles from a latex and by other methods. The film may be thermoplastic or thermosetting.

The polymer should be chemically capable of forming a suitable adherent film on the substrate of interest and for best results, be capable of bonding with the individual pigment particles in the coating film.

If desired two or more polymers may be used in the composition and the coatings of the invention.

The weight percentage of the organic polymer in the liquid composition generally ranges from about 5 to about 90%.

Generally the minimum amount of organic polymer is that amount or ratio which in conjunction with the pigments will impart a perceptible improvement or resistance to corrosion for metal substrates coated with the composition. The maximum amount or ratio of organic polymer is that amount or ratio beyond which no significant improved resistance to corrosion of metal substrates is observed.

The organic polymer acts as a carrier and matrix for the pigments further described herein and also as a protective barrier coating for metal substrates. In general the thickness of the polymer coating does not exceed about 40 $\mu$m. The coating may be thinner or thicker depending on the application, the pigment sizes and other factors known to one skilled in the art. It is understood that the coating thickness should make allowance for the variety in individual sizes of the pigments used in accordance with the invention. It will be recalled that the sizes of the individual particles in the powders vary within a range so as to give the distribution of sizes noted herein (e.g. $\overline{ESD}$).

Solvents (or liquids to disperse the polymer) which are useful in accordance with the invention include but are not limited to aliphatic hydrocarbons, aromatic solvents, alcohols and other oxygenated solvents, substituted hydrocarbons, phenols, substituted aromatic hydrocarbons and halogenated aliphatic hydrocarbons. Each resin system has a group of solvents and diluents compatible with the resin and suitable for film forming. In some cases the organic solvent is only used to disperse the resin powder. It is contemplated that water can be used as solvent/diluent or dispersant for some resin pigment compositions.

THE PIGMENTS USED IN THE POLYMER COMPOSITIONS

In accordance with the invention the liquid or non-liquid composition contains two essential inorganic components hereinafter called "pigments".

The first pigment is called herein an ion reactive, the other a compound which is leachable out of the cured coating. The pigments are discussed in the following sections.

THE ION REACTIVE PIGMENT

It has been found in accordance with the invention that the metal substrate protection provided by the ion reactive pigment acting in conjunction with the other components of the composition, is surprisingly, and remarkably improved over what would have been expected. While it is known, as discussed hereinabove, that aluminum (or other like metals) can be used as pigments to protect metal substrates, often in conjunction with inorganic phosphate coatings, it has been found in accordance with the invention, that only a particular preferred shape can impart the remarkably improved resistant properties of the present invention to severe environmental conditions typically salt spray or an acid atmosphere.

The word "reacting" as used herein relates to the metallic pigment "reacting" instead of or in preference to the metal substrate (which is being sought to be protected) but is not reacting galvanically or sacrificially, i.e. in the sense of providing electrons to the substrate. This difference is especially pertinent with respect to the compositions in which zinc dust is one of the pigments.

The shape of these metal particles is spherical or spheroidal-like including particles called metal "dusts". Furthermore, it has been found that spheroids of a particular size maximize the properties discussed above. Preferred are metal spheroids of an average equivalent diameter ($\overline{ESD}$) as defined hereinafter of less than about 10 $\mu$m and preferably not over 44 $\mu$m maximum particle size. Coatings formulated using inert gas atomized aluminum pigment particles show superior performance when compared with air atomized pigments. Inert gas atomized aluminum particles having $\overline{ESD}$ parameters of 2-4 $\mu$m have improved performance when compared to larger particles. Such metal spheroids appear to maximize the protection of the substrate surfaces. It was expected that spheroid pigments when used in a barrier coating would provide less protection against environmental conditions than a flake-type pigment as is known in the prior art. See "Inorganic Primer Pigments" by Smith, incorporated herein by reference.

The ion reactive pigments used in the invention are spheroid particles of any suitable metal. Illustrative of the class of metal spheroids are aluminum, magnesium, zinc, cadmium and other alloys. Magnesium/aluminum alloys and alloys of the other above-mentioned metals are included. U.S. Pat. No. 4,537,632 to Mosser and the metallic powders listed therein are incorporated herein by reference. Zinc dust in the form of spheroids or non-spheroids has also been found useful. This metallic pigment functions to control the pH and act it is believed, reactive to react, complex, neutralize, passivate or counteract in anyway (that is not fully understood), the adverse effect of the ions on the metal, in salt spray, industrial, ocean air or acid rain environments.

Preferably, this action contributes to maintain the pH in the range of 5 to about 9 to 10. More preferably, for maximum effect of the leachable pigment the pH is to remain slightly on the basic side. Further, the optimum pH at which the second pigment will act best will depend on the particular pigments. For instance, the following pigments seem to work best at the following pHs: zinc chromate, about 8.0; barium metaborate, about 10.00; zinc borate, about 5.0.

Illustrative ions which attach these metal substrates in severe environmental conditions include chlorides, and other halides, sulfates, sulfites, phosphates, and all the ions produced by the reaction of acid gases ($NO_x$), ($SO_x$) with water. The metallic spheroid particles by functioning as an ion reactive pigment, protect the metal especially the active metals described herein from chemical attack by the ions.

In the case of aluminum serving as the ion reactive pigment in salt spray/salt or acid air environments, it is thought that aluminum hydroxide reacts with chloride ions to form an aluminum chlorohydrate complex according to the following reaction:

$$Al(OH)_3 + H_3O^+ + Cl^- \rightarrow [Al(H_2O)_6]^{+3}Cl_3^{-3}.$$

For the ion reactive pigment to function effectively as desired, it has been found desirable that it be used in a proportion with the leachable pigment described further herein in an amount to give an improvement in the tests used herein (e.g., the CASS and salt spray test). The maximum amount of ion reactive pigment is that amount beyond which no improved worthwhile resistance to corrosion of metal substrates is imparted by the coating composition without significantly comprising other film properties.

The range of combined functional pigments of the invention (by volume) to the balance of the components in the dried, cured coating may range from about 5 to about 95%; commonly about 15 to 50%. If excess were used it would result in a coating film having less than 100% density. This is not desirable with respect to barrier corrosion resistance, so that exceeding the recommended pigment volume concentration (CPVC) may not result in optimum coating performance.

When determining the optimum ratio of the two kinds of inorganic pigments to each other factors such as pigment density, reactivity, leaching rate, particle size, particle shape and opaqueness should be considered by one skilled in the art. Substitution of a less dense pigment on an equivalent weight basis for a denser pigment may result in exceeding the CPVC and introducing film porosity and other defects. This may or may not be significant depending on whether or not barrier sealer film properties are essential. The ratio of leaching pigment to total functional pigment as described in the invention by volume can vary from about 1% to about 99%. In practice, the ratio typically ranges from 10% to 50% by volume.

As discussed herein, the mode of action of the ion reactive pigment is not fully explainable. However, the reactive $Cl^-$ ion is believed to be prevented from reacting with the metal substrate. That is the $Cl^-$ ion preferentially corrodes the aluminum pigment rather than the metal substrate. It is also believed the slightly alkaline condition of the coating composition due to the corrosion of $Al(OH)_3$ as the aluminum pigment corrodes, also "ties up" the $Cl^-$ from reacting with the metal substrate. Thus in a general manner, in accordance with the invention, any metal spheroid can be used as an ion reactive pigment if it will react preferentially with the corrosive ions in the environment.

Regarding the particular nature of the metal, the metallic spheroid particles can be the same metal as the substrate metal of the part to be coated or it can be of a different active metal.

The metal spheroidal particles used in the coating composition may be metals such as zinc, cadmium, magnesium, aluminum or other active metals which have the spheroidal configuration. The nature of the metal selected is generally related to the particular physical-chemical properties required or intended for the coating. A metal is generally selected which does not detract from the improvements provided by the invention. The preferred metallic pigments are those which preferentially corrode instead of the metal substrate and protect the substrate from chemical attack by ions generated by the conditions discussed.

While as explained partially above, it is believed that the ion reactive pigment functions by reacting with corrosive ions such as chloride ions and in addition controls pH within the coating, it is believed to perform other useful functions within the coating film. For example, barrier coating films are protective only while they are undamaged. A film containing metallic flake pigment is less able to withstand damage caused by impact because of the structure of the flake pigmented layer. Reverse or direct impact will produce interlamellar failure since the coating is anisotropic. Coatings pigmented with spheroidal pigments, particularly of aluminum are ductile and malleable and able to withstand or absorb impact stress by pigment deformation.

Use of spheroidal pigments allow for high loadings of very small metallic pigment particles and still maintain low viscosity coatings. Use of flake pigments at high loadings would result in coatings of ultra high viscosity and poor physical properties on application.

Surprisingly, coatings of the invention containing high loadings of metallic pigments are extremely resistant to corrosion. Normally, (as referred to above) it is desirable to reduce conductive metallic pigment loadings in an anti-corrosive barrier films to maintain as low electrical conductivity in the films as possible. The present coating in contrast is quite high in pigment loading. Commonly the loading with pigments may be high as about sixty (60) volume percent or more.

In a preferred embodiment aluminum spheroid particles are used as the ion reactive pigments. The aluminum spheroid particles can be produced through air or gas atomized techniques as known in the prior art. For techniques on how aluminum spherical particles are obtained reference is made to U.S. Pat. Nos. 4,537,632 to Mosser, 4,659,613 to Mosser et al. and 4,724,172 to Mosser et al., which are incorporated herein by reference. Air-atomized grades of aluminum powder are produced by aspirating molten metal through a nozzle into a supersonic stream of air. A stream of liquid aluminum is broken into individual droplets by the jet of air, each droplet is initially flattened and elongated by the force of the gas stream. Under ideal conditions, these droplets would rapidly contract into a spherical shape in order to minimize surface area and surface energy. However, when the molten aluminum contacts the air, a hard, dense oxide film immediately forms on the surface of the liquid drop. This oxide shell causes the droplet to solidify in its initial distorted shape. Consequently, air-atomized aluminum powder particles are irregular in shape and generally the smaller the particle, the greater its variance from the perfectly spherical shape. Special spherical grades of atomized aluminum are also commercially available. Spherical powders are produced by aspirating molten aluminum into a jet of a reducing gas, such as hydrogen or an exothermic mixture of combusted methane, or an inert gas, such as helium or nitrogen. These grades of gas-atomized aluminum are referred to as "spherical" powders although they never actually achieve perfect sphericity because of the effect of gravity on the molten matal droplet. Air-atomized and non-oxidizing gas-atomized powders are typically characterized according to one of the following measured parameters: particle size or average particle diameter, particle size distribution, and particle shape or configuration. Particle size, the parameter most commonly used to distinguish grades of powder, is generally synonymous with particle diameter; however, particle diameter can only be determined accurately for spherical powders.

Since actual atomized powder particles rarely exhibit a perfect spherical shape (for reasons mentioned above), the particle size is most usefully established by measuring a characteristic property of an irregular particle that can be related to the same property of an ideal regularly shaped particle. By choosing a sphere as the ideal shape, the size of both air- and non-oxidizing gas-atomized powders can be reliably described as "equivalent to a sphere in diameter (d)", thereby combining the parameters of size and shape in a single variable. An unequivocal, reproducible particle size having one dimension is thus established with this definition.

The equivalent spherical diameters (ESD) and average equivalent spherical diameters ($\overline{ESD}$) of aluminum or other metal particles in a particular grade of powder are measured by automated sedimentation equipment such as the Micromeritic SediGraph 5000E particle size analyzer. This device uses low energy X-rays to determine the concentration of particles at various depths in a column of known fluid. The SediGraph determines the population of particles of a particular mass in the powder grade by measuring the density of particles at a given level within the fluid. Grades of atomized powders are completely characterized by the population size distribution measured by the sedimentation technique and the $\overline{ESD}$ corresponding to the median value in the distribution.

In accordance with this invention, both air- and non-oxidizing gas-atomized aluminum powders are described using average equivalent spherical diameter ($\overline{ESD}$) measurements provided by sedimentation equipment. Additional information regarding analytical test methods for characterizing aluminum powders is provided in the Alcoa pamphlet section PAP917 (FA2D-2) entitled "Quality Control and Analytical Test Methods for Alcoa Aluminum Powders". For additional information about sedimentation measurements, see the pamphlet entitled "A Short Course in Fine Particle Technology" provided by Micrometrics Instrument Corporation. These documents are incorporated herein by reference.

LEACHABLE PIGMENT

In accordance with the invention the composition contains a second pigment, a leachable pigment capable of inhibiting or passivating the corrosion of metal. The leachable pigment is typically a salt containing chromate, molybdate, vanadate, tungstate, plumbate, phosphate or metaborate as well as others as listed in the publication by Smith, entitled "Inorganic Primer Pigments", Federation Series on Coatings Technology which is incorporated herein by reference. The cation of the salt can be any cation which forms a salt with the above-mentioned ion and produces a salt of limited solubility typically strontium, zinc, barium, potassium, sodium, calcium, lithium, magnesium as well as others.

A preferred leachable pigment in accordance with the invention are chromate containing pigments. In accordance with the invention, preferred salts which form the leachable pigment include strontium chromate, zinc chromate, zinc tetraoxychromate, zinc potassium chromate, barium chromate, and barium metaborate.

Chromate is believed to act as an oxidizing inhibitor. The chromate is also thought to form a thin oxide layer on the metal to be protected which acts as a protective film. The chromate is known to leach out of the organic resin polymer and thereby passivate the metal by forming a protective film.

Chromate pigments can be manufactured (precipitated) out of alkaline solutions and leach out as slightly alkaline materials. The slightly alkaline pH of the coating composition facilitates neutralizing the environmental solution containing the reactive ions, e.g. $Cl^-$ and $SO_4^-$. It is believed that the ion reactive pigment assists in stabilizing the pH in the neutral to slightly alkaline range, allowing the leachable pigment to be more effective.

In accordance with the invention the ratio of leachable pigment to the ion reactive pigment is in the range of about 5% to about 95%.

The minimum amount of leachable pigment is that amount which in conjunction with the organic resin and ion reactive pigment will impart a perceptible improvement in resistance to acidic and/or salt corrosion for metal substrates coated with the composition. The minimum amount is about >0.5%. The maximum amount of leachable chromate is that amount beyond which no improved resistance to corrosion of metal substrates is imparted by the coating composition.

It is evident that one skilled in the art can without undue experimentation determine the optimum amounts, ratios, etc. depending on the metal to be coated, severity and expected duration of exposure and other such factors and considerations.

OPTIONAL INGREDIENTS

In accordance with the invention, optional ingredients may be added to the coating composition. These optional ingredients include but are not limited to extenders, fillers, lubricants or refractory compounds such as silicone, mica, titanium dioxide, carbon black. Surface active compounds (ions, cationics, and non-ionics) are also useful. The optional ingredients may be added to impart desired qualities to the composition but are not to be added in quantities which would lessen, interfere or detract from the ability of the coating composition to protect metal substrates in salt spray, salt air, acid rain, or other severe environmental conditions.

METAL SUBSTRATES TO BE COATED

In accordance with the invention, metals which benefit most from being coated with the composition disclosed in this application are those active metals which corrode or deteriorate in salt spray, salt air, acid rain or other severe environmental conditions due to the action of ions such as $Cl^-$ or $SO_4^-$ (or equivalent ions) in the presence of low pH. For purposes of this application, those metals designated as "active metals" as defined herein, will particularly benefit from being coated with the composition of the invention. "Active metals" are defined herein as those metals and alloys thereof which are electrochemically (i.e. galvanically) active metals as measured by a galvanic potential of greater than $-0.6$ volts with respect to a calomel electrode in 5% salt solution, i.e. those metals anodic to steel. Thus, active metals in accordance with the invention include but are not limited to magnesium, aluminum, manganese, zinc, and cadmium alloys, of these metals, and metal matrix composites incorporating these metals or alloys thereof.

In addition, coating of these metals and alloys are suitable substrates. For example, zinc plated steel is a suitable substrate. Electrolytic and mechanical platings of zinc, zinc alloys, aluminum and cadmium are surfaces suitable for the coating. Usually these surfaces are conversion coated "chromated" or "phosphated". In addition, ion vapor deposited aluminum is a suitable substrate. Coatings containing aluminum or other active metal pigments in ceramic coatings such as are described by Allen in U.S. Pat. No. 3,248,251 and Brumbaugh, U.S. Pat. No. 3,869,293 are suitable substrates. Particularly preferred metal substrates include magnesium and aluminum and alloys thereof including aluminum/lithium alloys, because of their desirable properties as discussed hereinabove.

As previously noted "active" metals all have an oxide or hydroxide protective film or scale. It is this film that is attacked by the acidic environment and chloride ion. For proper protection of these active metals, this oxide/hydroxide surface should be replaced with a chemical pretreatment. The pretreatments possibly depend on the metal and alloy being protected, and are known. Magnesium is protected by anodizing and by conversion coatings. These treatments are known and are described in numerous references. A convenient reference that includes all the substrates in question is *Metals Handbook, Ninth Edition, Volume 5, Surface Cleaning, Finishing, and Coating*. (ASM Metals Park Ohio). While a variety of surface treatments are possible, a few are commonly used. For example magnesium is anodized using the HAE Process and by the Dow 17 Process. When not anodized magnesium alloys are conversion coated using several kinds of "chrome pickle" or "chrome manganese treatments".

Aluminum alloys are anodized in a variety of baths including sulfuric, chromic, phosphoric, and other acids and mixtures. Conversion coatings are applied to aluminum alloys that are not anodized. These conversion coatings are usually chromate based acidic solutions in which the aluminum alloy components are processed.

Zinc and cadmium surfaces are usually treated in a "chrome pickle" solution, a dichromate sulfuric acid mixture. These are described in the above referenced volume.

All these passivated, anodized or conversion coated surfaces of the active metals are suitable as bases for coatings of the invention. The invention can be applied directly over these metal surfaces or in some cases, directly over the cleaned, untreated metal surface. This is common in the case of application the invention to aluminum-filled coatings. It is also expected that some surfaces, such as anodized surfaces, may be pretreated with a sealer coating to impregnate and infiltrate intersticial porosity. Such sealers must be compatible with the coating of the invention to ensure adhesion and proper bonding. When compatible such sealers may enhance the coating performance.

As is discussed herein, the metals to be coated are active metals. The metal or non-metal part (e.g. ceramic) may be coated with that metal or the part may be constituted of the metal. Generally the metal surface to be treated, i.e. the base for the coating of the invention, is pretreated, as discussed, but it need not be so pretreated.

METHOD OF THE INVENTION

In accordance with the invention, a method of coating metals with the composition of the invention is provided. Before testing the metal in accordance with the invention, the part to be treated is first pretreated with a conventional pretreatment such as a chromate conversion coating or an anodization. The substrate is then coated by applying, brushing, rolling, spraying, dip/spinning or dipping the liquid composition of invention. After the liquid composition has been coated on the part, the composition is cured either by heating for a given period of time or by an appropriate air curing/setting mechanism. The curing temperature should be below the tempering temperature of the metal substrate itself. The curing steps may remove excess solvent and permit cross-linkage of the resinous polymer to occur, if required. The cross-linking of the polymer provides for a coating of improved durability in severe environmental conditions. After curing, the coated metal part is ready for use in these environmental conditions, where it displays markedly improved resistance to corrosion. It is often found that sealer coats compatible with the resin used in the composition of the invention may be applied over the functional coating. Thus, the coating of the invention may have a top coat thereover. Use of multi-step sealers and complex processing are preferably avoided.

The following examples of the embodiments of the invention, namely the coating composition, coated metal parts and method of applying the coated composition to metal parts are offered by way of illustration and not by way of limitation.

The amounts of ingredients in the compositions listed in the following examples are given in weight gram units, unless designated differently.

EXAMPLE 1

In this example three different coating compositions are prepared and evaluated for their corrosion resistance properties.

All of the coating compositions contain amide-imide epoxy resins.

One formulation contains strontium chromate as a leachable pigment. This formulation is designated as Composition 1A and its ingredients are listed below.

COMPOSITION 1A

| | |
|---|---|
| Amide-imide resin, Amoco AI-10 | 250.0 |
| Epoxy resin, Ciba Geigy GY-6010 | 60.1 |
| N-Methyl-2-Pyrrolidone (NMP) | 981.7 |
| Ethyl acetate | 67.1 |
| Silicon resin, GE SR-112 | 4.0 |
| Fluorocarbon surfactant, 3M FC-430 | 2.7 |
| Strontium Chromate | 134.0 |
| Total | 1,449.6 |

This formulation was made by completely dissolving the AI-10 amide-imide resin and epoxy resins into NMP. The ethyl acetate and surfactants were then added. The strontium chromate pigment was dispersed, added and filtered through a 325 mesh screen.

Another formulation contains aluminum powder pigment. This formulation is designated as Composition 1B and its ingredients are listed below.

COMPOSITION 1B

| | |
|---|---:|
| Amide-imide resin, Amoco AI-10 | 250.0 |
| Epoxy resin, Ciba Geigy GY-6010 | 60.1 |
| NMP | 981.7 |
| Ethyl acetate | 67.1 |
| Silicone resin, GE SR-112 | 4.0 |
| Fluorocarbon surfactant, 3M FC-430 | 2.7 |
| 3-4 μm ESD aluminum spherical powder, Valimet H-3 | 469.8 |
| Total | 1,835.4 |

The coating was prepared in the same manner as Composition 1A.

Another formulation contains both the aluminum powder pigment and the strontium chromate. This formulation is designated as Composition 1C and its ingredients are listed below. Composition 1C constitutes one of the formulations of the invention.

COMPOSITION 1C

| | |
|---|---:|
| Amide-imide resin, Amoco AI-10 | 621.5 |
| Epoxy resin, Ciba Geigy GY-6010 | 149.5 |
| NMP | 2,472.0 |
| Ethyl acetate | 169.0 |
| Silicone resin, GE SR-112 | 10.0 |
| Fluorocarbon surfactant, 3M FC-430 | 6.7 |
| Strontium chromate | 333.7 |
| 3-4 μm ESD aluminum spherical powder, Valimet H-3 | 1,168.0 |
| Total | 4,930.4 |

Each of the three coatings was spray applied onto separate ASTM Alloy No. AZ31B magnesium panels.

This magnesium alloy has a nominal composition of 3.0% Al, 1.0% Zn, 0.3% Mn, the balance is Mg.

Prior to coating, the AZ31B magnesium was chromate conversion coated using the Dow 1 process developed by Dow Chemical Co. The process steps include vapor degreasing in 1,1,1-trichloroethane. The panels were immersed for 15 seconds in 10 wt. % nitric acid, cold water rinsed, a 1 minute dipped in acid chromate aqueous solution (15 wt. % $Na_2Cr_2O_7$ and 25 wt. % $HNO_3$ (SG 1.42)), cold water rinsed, and dried.

All coatings were spray applied to a dry film thickness of 0.6-1.2 mil (1 mil=0.001 inch). Each coat was dried at 175° F. for 15 minutes prior to a one hour 300° F. cure.

The coated panels were then coated with a topcoat containing a gray amide-imide epoxy. This topcoat is designated Composition 1D and its ingredients are listed below. It contains only pigments to give it a gray color and does not contain the corrosion inhibitive pigments of Compositions 1A, 1B and 1C.

COMPOSITION 1D

| | |
|---|---:|
| Amide-imide resin, Amoco AI-10 | 860.5 |
| Epoxy resin, Ciba Geigy GY-6010 | 207.2 |
| NMP | 2,726.0 |
| Ethyl acetate | 231.2 |
| Silicone resin, GE SR-112 | 13.9 |
| Fluorocarbon surfactant, 3M FC-430 | 9.3 |
| Fumed Silica (Cab-O-Sil M-5) | 3.2 |
| $TiO_2$ (DuPont R-1) | 269.0 |
| Carbon black, Cabot Regal 400R | 29.0 |
| Total | 4,349.3 |

Composition 1D was prepared by dissolving AI-10 amide-imide resin in NMP. The epoxy resin, ethyl acetate, and surfactants are stirred in until homogeneous. The pigments are dispersed by a 24 hour ball mill cycle. The composition was filtered through a 325 mesh screen.

The following compositions containing a primer and topcoat as listed below were then subjected to a variety of tests.

| System No. | Primer | Topcoat | Total Thickness (mils) |
|---|---|---|---|
| 1. | 1A | 1D | 2 |
| 2. | 1B | 1D | 2 |
| 3. | 1C | 1D | 2 |

The panels were first tested for initial crosshatch adhesion, ASTM D 3359. All three systems yielded excellent intercoat adhesion results, characterized by a 5B classification which is the highest rating for adhesion of coating films to metallic substrates.

Unscribed panels of each coating system were also exposed to Copper Accelerated Acetic Acid-Salt Spray (Fog) Testing (CASS TEST), ASTM B 368. This test is conducted at a pH of 3.1 to 3.3 and simulates severe acidic exposure conditions.

The results after six weeks of exposure are shown below.

| System | Six Weeks Exposure |
|---|---|
| 1. | Moderate shite corrosion products on the entire panel |
| 2. | Moderate white corrosion products on the entire panel |
| 3. | No corrosion products |

The results showed the improved effectiveness of the pigment combination in accordance with the invention in combating acidic environment corrosion. Similar high levels of corrosion resistance were achieved with system 3 in neutral Salt Spray (ASTM B 117) and Humidity Exposure (ASTM D 2247).

EXAMPLE 2

In Composition 1C, strontium chromate is substituted on an equivalent volume basis by barium metaborate as the leachable pigment. Following the procedure in Example 1 in which magnesium panels are coated, and after appropriate curing, good resistance to acid corrosion is observed on the coated magnesium panels with this coating.

EXAMPLE 3

Similarly, in Composition 1C, strontium chromate is substituted on an equivalent volume basis with basic zinc molybdate. After appropriate curing and following the procedure of Example 1 in which magnesium panels are coated, good resistance to corrosion in the salt spray test is observable.

EXAMPLE 4

In Composition 1C, strontium chromate is substituted on an equivalent volume basis by zinc phosphate. After appropriate curing and following the procedure of Example 1 in which magnesium panels are coated, the coating is observed to inhibit the formation of corrosion products.

EXAMPLE 5

In Composition 1C, aluminum powder is replaced by cadmium powder in equivalent volume amount. A coating with good corrosion resistance results.

EXAMPLE 6

In Composition 1C, the resin is substituted by a phenoxy resin and dissolved in a suitable solvent. A satisfactory coating is obtained following a similar procedure of Example 1 in which magnesium panels are coated.

EXAMPLE 7

In Composition 1C, the resin is substituted with polyvinylidene fluoride and suitable solvents. After following the procedure in Example 1 in which the magnesium panels are coated, the composition displays useful properties as a corrosion resistant coating to the CASS test.

EXAMPLE 8

In Composition 1C, the resin is substituted with polyethylene and suitable solvents. After following the procedure in Example 1 in which the magnesium panels are coated, the composition displays good corrosion resistent properties to salt spray.

EXAMPLE 9

In Composition 1C, the resin is substituted with polyimide. After performing the procedure in Example 1 in which the magnesium panels are coated, the composition displays good corrosion resistent properties to acid exposure.

EXAMPLE 10

In this example, the use of zinc chromate/aluminum powder pigmented amide-imide coatings without the epoxy low temperature cure additive is demonstrated. The 500° F. temperature required for cure limits the metal alloys that can be coated with this system. One of the formulations used in the Example is designated Composition 10A and its ingredients are as follows:

COMPOSITION 10A

| Amide-imide resin, Amoco AI-10 | 26.47 |
| --- | --- |
| N-Methyl-2-Pyrrolidone (NMP) | 104.03 |
| Ethyl acetate | 7.12 |
| Xylene | 18.60 |
| Silicone resin, GE SR-112 | 0.42 |
| Fluorocarbon surfactant, 3M FC-430 | 0.29 |
| Zinc chromate | 27.59 |
| 3-4 μm ESD aluminum spherical | 94.73 |
| Total | 279.25 |

This combination was dispersed on a Hockmeyer mixer until the pigments were well dispersed. It was filtered through a 325 mesh screen.

Composition 10B consisted of the following:

COMPOSITION 10B

| Amide-imide resin, Amoco AI-10 | 860.5 |
| --- | --- |
| NMP | 2.726.0 |
| Ethyl acetate | 231.2 |
| Silicone resin, GE SR-112 | 13.9 |
| Fluorocarbon surfactant, 3M FC-430 | 9.3 |
| Fumed silica (Cab-O-Sil M5) | 3.0 |
| $TiO_2$, R-100 DuPont | 269.0 |
| Carbon black, Cabot Regal 400R | 29.0 |
| Total | 4,141.9 |

The composition 10B was processed in the same manner as coating "1C" and will be used as the protective barrier film over Composition 10A.

Both of these coatings were applied over two separate substrates both capable of withstanding 500° F. cure temperature. The first substrate was ANSI 3003 aluminum with major alloy elements, 1.28% manganese, and 0.126% copper which was vapor degreased in 1,1,1 trichloroethane, chromate conversion coated by application of Alodine 1200S (1.2 oz/gal concentration) for 1 minute. The substrate was then water rinsed and dried prior to application of the coatings.

The second substrate is AISI 1010 steel which was vapor degreased and blasted with clean 100 mesh aluminum oxide grit. A chromate/phosphate inorganic coating, pigmented with small aluminum spheroidal particles was applied. This inorganic base coating is disclosed in Mosser (U.S. Pat. No. 4,537,632) and is similar to Example 1 in that patent. This inorganic basecoat was spray applied to the steel substrate, oven dried at 175° F. for 15 minutes and cured at 650° F. for 30 minutes. After cooling, a second coat was applied and the drying and curing steps repeated. The substrate was then burnished to mechanically cold work the coating surface by light blasting with 140-270 mesh glass beads or $Al_2O_3$ grit. The basecoat becomes electrically conductive and sacrificial by this process.

The amide-imide 10A composition was spray applied to 1.0 mil dry film thickness, dried at 175° F. for 15 minutes and cured at 500° F. for 30 minutes. Amide-imide 10B composition was applied and cured over 10A according to above procedure.

A summary of the coatings and substrates is set forth as follows:

| Coating System | Alloy | Pretreat | Primer | Topcoat |
| --- | --- | --- | --- | --- |
| 1 | 3003 | Alodine | 10A | 10B |
| 2 | 1010 | Blast | per U.S. Pat. No. 4,537,632 | 10A |

Composition 2 resisted corrosive environments well and endured 1,000 hours scribed in ASTM B 117 with only some scribe corrosion. Unscribed exterior exposure panels at 15 weeks exposed to 5% daily salt spray were corrosion free.

Composition 1 on conversion coated ANSI 3003 aluminum substrate was very corrosion resistant as evidenced by scribed panels showing no corrosion at 1,000 hours salt spray ASTM B 117. Physical properties such as impact resistance and flexibility over a conical mandrel were excellent for both compositions 1 and 2.

EXAMPLE 11

In this example, the coatings 10A and 10B and the substrate are the same as in Example 10 except that the coatings are cured at 300° F. for one hour instead of 500° F. for one-half hour.

It is found that the physical properties of 10A and 10B systems are compromised. The films tend to crack and craze upon direct impact testing or conical mandrel bend. At 300° F. cure, a thermoplastic film was formed when the solvents evaporated. No apparent imidization reaction had occurred to cross link the film and improve its properties.

EXAMPLE 12

A British Ministry of Defense specification clear epoxy sealant DTD-5562 was pigmented with strontium chromate and aluminum 3–4 μm $\overline{ESD}$ spherical powder in the same pigment/pigment and pigment/resin weight ratio as Composition 1C in Example 1. This was to demonstrate the efficacy of this pigment combination. An unpigmented DTD-5562 epoxy was run as a control on the same magnesium substrate panels.

DTD-5562 British Defense Specification epoxy sealant was prepared in which 30–35% by weight of the composition consists of resin solids, the balance is high hydrocarbon volatile solvent. This formulation is designated as Composition 12A and its ingredients are listed below.

COMPOSITION 12A

| | |
|---|---|
| DTD-5562, Epoxy | 400.0 |
| Strontium chromate | 55.4 |
| 3–4 μm $\overline{ESD}$ spherical aluminum powder, Valimet H-3 | 193.9 |
| Total | 649.3 |

These pigments were stirred under Hockmeyer disperser agitation. The coating was then filtered through a 200 mesh sieve.

COMPOSITION 12B

DTD-5562 clear epoxy sealant without any pigment additions was designated 12B.

Two types of magnesium panel substrate, AZ31B and AZ91C were coated with the above Compositions 12A and 12B. The AZ31B magnesium was first pretreated with the Dow 1 process outlined in Example 1. The AZ91C magnesium was given a chrome-manganese pretreatment as follows: The panels were grit burnished at 10 p.s.i. with Al₂O₃ grit 90–120 mesh to remove the mill applied coating. The AZ91C panels were immersed 15 seconds in 10 wt. % HNO₃ and rinsed with cold water. The panels were then immersed for 2 hours in an aqueous chrome manganese bath composition (10% wt. $Na_2Cr_2O_7.2H_2O$, 5% wt. $MnSO_4.5H_2O$, and wt. 5% $MgSO_4.7H_2O$). They were then rinsed with cold water and dried.

These coatings were spray applied to both substrates, with each coat cured at 400° F. for 40 minutes.

Coatings were applied to substrates as shown below:

| System No. | Substrate | Coating |
|---|---|---|
| 1. | AZ31B | 12A |
| 2. | AZ31B | 12B |
| 3. | AZ91C | 12A |
| 4. | AZ91C | 12B |

All systems were subjected to four heat cycles. A heat cycle is defined as:

8 hours at 300° F.
16 hours salt spray, ASTM B 117
8 hours at 300° F.
16 hours CASS, ASTM B 368

On both AZ31B and AZ91C magnesium where one coat of pigmented 12A was applied, no corrosion occurred. Where clear unpigmented 12B sealant was applied to both substrates, moderate to severe white corrosion products had occurred. This result supports the utility of strontium chromate-aluminum powder (leachable - ion reactive) pigment combination.

EXAMPLE 13

An ambient cure Steel Structures Painting Council (SSPC) reference epoxy primer was pigmented with strontium chromate and 3–4 μm $\overline{ESD}$ spherical aluminum powder. This formulation is designated Composition 13A and its ingredients are listed below. Another SSPC primer is prepared without the aluminum powder, being the same in other aspects. This formulation is designated Composition 13B and its ingredients are listed below.

COMPOSITION 13A

| | |
|---|---|
| Epoxy resin, Ciba Geigy GY-6010 | 89.62 |
| Strontium Chromate | 33.33 |
| 3–4 μm $\overline{ESD}$ spherical aluminum powder, Valimet H-3 | 116.67 |
| Magnesium silicate | 42.00 |
| Mica, 325 mesh | 13.87 |
| Organophilic clay, NL Industries Bentone 27 | 3.75 |
| Methanol/water 95/5% | 1.50 |
| Urea leveling agent, Bettle 216-8, American Cyanamide | 4.87 |
| Methyl isobutyl ketone | 14.25 |
| Xylene | 42.37 |
| Cellosolve | 22.50 |
| Polyamide, Ciba Geigy XUHY283 | 62.25 |
| Total | 446.91 |

The compositions were mixed for 20 minutes with a Hockmeyer disperser than screened through a 100 mesh screen and finally mixed with a polyamide curing agent, Ciba Geigy XUHY283.

COMPOSITION 13B

This coating is the same as Composition 13A, except it does not contain aluminum powder pigment.

The coatings were spray applied to 2 mils dry film thickness on AISI-SAE 1010 steel, AA 7075 aluminum alloy and AZ31B magnesium panels.

Aluminum and magnesium were pretreated as detailed in Examples 1 and 10. The steel was degreased and grit blasted with 90–120 mesh Al₂O₃ grit. Panels were allowed one week at room temperature to fully cure.

The tabulation below shows the substrate and the corresponding primer for each system.

| System No. | Substrate | Primer |
|---|---|---|
| 1. | 1010 steel | 13A |
| 2. | 7075 Al | 13A |
| 3. | AZ31B | 13A |
| 4. | 1010 Steel | 13B |
| 5. | 7075 Al | 13B |
| 6. | AZ31B-Mg | 13B |

The systems were exposed to CASS ASTM B 368 exposure, unscribed, for five weeks. All three substrates, steel, aluminum, and magnesium that were coated with composition 13A developed only very slight corrosion over less than 1% of panel surface area. Panels of all three substrates, coated with 13B, which does not contain any aluminum powder, but only strontium chromate pigment developed severe corrosion over more than 50% of panel surface area. These results demonstrate the utility of spherical aluminum powder (3-4 μm $\overline{ESD}$) as an ion reactive pigment along with the chromate. In this case, the aluminum reacts with chloride ion, minimizing chloride ion attack on the substrate.

EXAMPLE 14

In this example, the utility of various types of metallic pigment as ion reactive reagent is demonstrated in an amide-imide film. The metallic pigments tested here were a 5 μm average particle size aluminum powder—Reynolds LSD-693, an 8 μm average particle size zinc dust—New Jersey zinc #122, and a 325 mesh magnesium powder—Reade RMC-325. The metallic pigments were formulated into Composition 1C type formulas in which the 3-4 μm $\overline{ESD}$ aluminum powder is replaced on an equal volume basis. Strontium chromate was included in all these formulations at the level used in composition 1C.

One of the formulations is designated as Composition 14A and includes the following ingredients.

COMPOSITION 14A

| | |
|---|---|
| Amide-imide resin, Amoco AI-10 | 38.31 |
| N-Methyl-2-Pyrrolidone | 150.34 |
| Ethyl acetate | 10.28 |
| Silicone resin, GE SR-112 | 0.62 |
| Fluorocarbon surfactant, 3M FC-430 | 0.41 |
| Epoxy resin, Ciba Geigy GY-6010 | 9.20 |
| 5 μm $\overline{ESD}$ aluminum powder, LSA 693 Reynolds | 72.00 |
| Strontium Chromate | 20.00 |
| Total | 301.16 |

This composition was stirred until the resins dissolved at room temperature. Pigments then were added and were well dispersed on a high speed stirrer. The coating was screened through 200 mesh.

Another of the formulations was designated Composition 14B and consists of the following ingredients.

COMPOSITION 14B

| | |
|---|---|
| Amide-imide resin, Amoco AI-10 | 36.39 |
| N-Methyl-2-Pyrrolidone | 143.00 |
| Ethyl acetate | 9.77 |
| Silicone resin, GE SR-112 | 0.58 |
| Fluorocarbon surfactant, 3M FC-430 | 0.39 |
| Epoxy resin, Ciba Geigy GY-6010 | 8.74 |
| 8 μm average zinc dust, #122 New Jersey zinc | 177.00 |
| Strontium Chromate | 19.50 |
| Total | 395.37 |

The processing steps are same as for Composition 14A.

Another of the formulations is designated Composition 14C and consists of the following ingredients.

COMPOSITION 14C

| | |
|---|---|
| Amide-imide resin, Amoco AI-10 | 38.31 |
| N-Methyl-2-Pyrrolidone | 150.34 |
| Ethyl acetate | 10.28 |
| Silicone resin, GE SR-112 | 0.62 |
| Fluorocarbon surfactant, 3M FC-430 | 0.41 |
| Epoxy resin, Ciba Geigy GY-6010 | 9.20 |
| 325 mesh magnesium powder, Reade | 46.40 |
| Strontium Chromate | 20.60 |
| Total | 276.16 |

The processing steps are the same as for Composition 14A.

The substrates were treated as follows:
1. Steel—grit blasted as in Example 10.
2. 7075-T6 aluminum—Alodine 1200S treatment as in Example 10.
3. Magnesium AZ31B—Dow 1 treated as in Example 1.

Formulations 14A, 14B and 14C were spray applied to all three substrates at 1.0 mil dry film thickness. The panels were dried for 15 minutes at 175° F. prior to 1 hours at 300° F. cure. Composition 1D topcoat was also applied to all panels and cured as above. The following is a summary of coating systems:

| System No. | Substrate | Primer | Topcoat |
|---|---|---|---|
| 1. | 1010 Steel | 14A | 1D |
| 2. | 7075-T6 Al | 14A | 1D |
| 3. | AZ31B-Mg | 14A | 1D |
| 4. | 1010 Steel | 14B | 1D |
| 5. | 7075-T6 Al | 14B | 1D |
| 6. | AZ31B-Mg | 14B | 1D |
| 7. | 1010 Steel | 14C | 1D |
| 8. | 7075-T6 Al | 14C | 1D |
| 9. | AZ31B-Mg | 14C | 1D |

Panels were scribed and exposed for 1,000 hours in salt spray (ASTM B 117 method). The steel substrate systems all showed corrosion problems such as creep and scribe rust. However, all three active metal pigmented (aluminum, zinc and magnesium) formulations protected light metal substrates 7075 Aluminum and AZ31B-Magnesium very well as evidenced by lack of corrosion of the test specimens.

EXAMPLE 15

Die cast zinc ASTM alloy AC41A housings having a major alloy composition of 0.25% copper, 3.5-4.3% aluminum, were coated with coatings 1C and 1D specified in Example 1. The zinc was cleaned by vapor degreasing in 1,1,1-trichloroethane and then pretreated by chromating in ($Na_2Cr_2O_7.2H_2O$, 6 ml concentration $H_2SO_4$, balance is $H_2O$ to 1 liter) for 10 seconds. The zinc parts then were rinsed in cold water and dried.

Composition 1C was applied as primer and 1D as topcoat and cured as indicated in Example 1.

A coated zinc die case housing was "X" scribed and placed in salt spray ASTM B 117 for 500 hours. At the end of the test, no corrosion was evident. A similar coated die cast housing was placed in an immersion solution of 0.5% NaCl and 2.5% methanol. At the end of 500 hours, no corrosion was evident. In each case the scribe area was clean and without evidence of corrosion. There was no creep or blistering along the scribe line.

EXAMPLE 16

This example incorporates the pigment combination strontium chromate and 3–4 μm ($\overline{ESD}$) aluminum powder formulated into an acrylicurethane coating system. This formulation is designated Composition 16A and consists of two parts which are individually prepared and then mixed together as set forth below. This composition is then cured at ambient room temperature.

COMPOSITION 16A

Part A

| | |
|---|---|
| Strontium Chromate | 45.9 |
| 3–4 μm $\overline{ESD}$ spherical aluminum powder, Alcan 5219 | 162.8 |
| Acrylic resin, Acryloid AU-568, Rohm & Haas | 113.9 |
| N-Butyl acetate-polyurethane grade | 97.7 |
| 2-Exthoxyethyl acetate-polyurethane, grade | 95.6 |
| Sand grind with equal weight of sand to 6+ Hegman grind dispersion, then let down with Acryloid AU-568, acrylic resin | 181.6 |

Part B

| | |
|---|---|
| Desmodur N-75 isocyanate resin, | 232.3 |
| N-Butyl acetate-polyurethane grade | 28.1 |
| 2-Ethoxyethyl acetate-polyurethane grade | 27.5 |
| After Parts A and B were mixed, add SF-1023 silicone surfactant | 0.4 |
| Total | 985.8 |

Composition 16A is suitable for spray application to a variety of active metal substrates after the substrates have been pretreated. Aluminum alloy 2024 or 7075 is suitable after Alodine 1200 treatment as detailed in Example 10. This coating will act well as a barrier as well as leachable corrosion inhibitor and ion reactive.

EXAMPLE 17

Barium chromate is a leaching pigment like strontium chromate, however, it leaches $Cr^{+6}$ ion much more slowly. Like strontium chromate, it will passivate active metal surfaces.

In Example 1, barium chromate can be substituted on an equivalent volume basis for strontium chromate in Compositions 1A and 1C. In this case the pigment combination is barium chromate and 3–4 μm ($\overline{ESD}$) aluminum powder. The consequences of using barium chromate are that it should last long in mildly corrosive environments, however, its slow leach rate makes it less appropriate for very corrosive situations. In midly corrosive environments the use of barium chromate is quite suitable. Additionally, immersion service applications may be suitable. Thus depending on the application intended appropriate selection of the pigments will be made.

EXAMPLE 18

A coating of Composition 1C was applied to a landing gear latch spring manufactured from UNS 530200 stainless steel. The spring (normally used by air plane manufacturers) had been grit blasted with 100 mesh aluminum oxide abrasive then passivated as per Federal Specification QQ-P-35a Type I prior to coating.

The coating of the invention was topcoated with a sealer of Composition 1D. After greater than 100,000 cycles of fatigue testing representing airplane takeoffs and landings, the spring showed no failure. After further testing in ASTM B 117 Salt Fog for 168 hours no corrosion was visible on the spring.

This illustrates the particular utility of the typical coating of the invention for aircraft manufacturers for parts likely to be exposed to acidic and salt spray environments, as well as by exposure to hot exhaust air from the jet engines.

This illustrates the value of typical coating of the invention on steel parts.

It is evident that numerous variations can be made which are within the scope and the spirit of the invention and substantial equivalents with substantially the same results are intended to be within the scope of the invention and the claims shown below.

We claim:

1. A metal part having a galvanically active metal surface of aluminum, magnesium, cadmium, manganese, zinc or their respective alloys which part is coated with a cured organic coating composition which forms an adherent film on the metal part which comprises a mixture of epoxy/polyamide-imide polymers in an organic solvent containing a first and a second inorganic pigment, the first pigment being an ion-reactive pigment consisting essentially of metallic spheroidal particles of an $\overline{ESD}$ in the range of about 2 to about 10 μm, the ion-reactive pigment being magnesium or aluminum, and the second pigment being a leachable chromate salt, which metal coated part has improved resistance to acidic or salty environmental conditions, especially acidic $Cl^-$ or $SO^-_4$ ions, and which polymers bond with the pigments to form a protective barrier coating for the metal part.

2. The metal part of claim 1 the second pigment is strontium chromate.

3. The metal part of claim 1, which has a topcoat free of corrosion inhibitive pigments.

4. The metal part of claim 1, wherein the weight percentage of the polymer is about 5 to about 90%.

5. The metal part of claim 1, wherein the galvanically active metal surface is anodized, conversion coated or passivated prior to being coated with the organic coating composition.

6. A metal part having a galvanically active metal surface of aluminum, magnesium, cadmium, manganese, zinc or their respective alloys which part is coated with a cured organic coating composition which forms an adherent film on the metal part which comprises an organic epoxy or polyamide-imide polymer in an organic solvent containing a first and second inorganic pigment, the first pigment being an ion-reactive pigment consisting essentially of metallic spheroidal particles of an $\overline{ESD}$ in the range of about 2 to about 10 μm, the ion-reactive pigment being magnesium or aluminum, and the second pigment being a leachable chromate salt, which metal coated part has improved resistance to acidic or salty environmental conditions, especially acidic $Cl^-$ or $SO^-_4$ ions, and which polymers bond with the pigments to form a protective barrier coating for the metal part.

7. The metal part of claim 1, wherein the galvanically active metal surface is anodized, conversion coated or passivated prior to being coated with the organic coating composition.

8. The metal part of claim 6 wherein the organic polymer is epoxy polymer.

9. The metal part of claim 6 wherein the organic polymer is a polyamide-imide polymer.

10. The metal part of claim 6, wherein the galvanically active metal surface is anodized, conversion coated or passivated prior to being coated with the organic coating composition.

11. The metal part of claim 6, which has a topcoat free of corrosion inhibitive pigments.

12. A stainless steel part coated with a cured coating of an organic resinous polymer which forms an adherent film on the metal part which is a mixture of epoxy/polyamide-imide polymers in an organic solvent, a leachable pigment which is strontium chromate and an ion-reactive pigment consisting essentially of aluminum spheroids of an ESD in the range of about 2 to about 10 μm, which steel part has improved resistance to corrosion in a slat spray environment, and which polymers bond with the pigments to form a protective barrier for the metal part.

13. The part of claim 12, which has a top coat.

14. The metal part of claim 1, wherein the chromate salt is selected from the group consisting of zinc chromate, zinc tetraoxychromate, zinc potassium chromate and barium chromate.

15. The metal part of claim 6, wherein the chromate salt is selected from the group consisting of strontium chromate, zinc chromate, zinc tetraoxychromate, zinc potassium chromate and barium chromate.

* * * * *